E. G. DODGE.
BATTERY PLATE.
APPLICATION FILED DEC. 26, 1908. RENEWED NOV. 4, 1911.
1,035,167.
Patented Aug. 13, 1912.
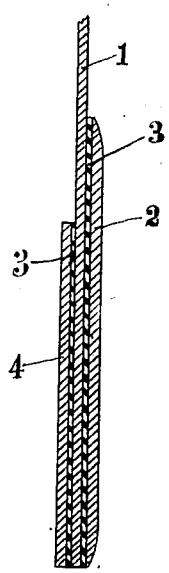
WITNESSES:
INVENTOR
*Eben G. Dodge.*
BY
ATTORNEYS.

UNITED STATES PATENT OFFICE.

EBEN G. DODGE, OF SOUTH ORANGE, NEW JERSEY.

BATTERY-PLATE.

1,035,167.        Specification of Letters Patent.        Patented Aug. 13, 1912.

Application filed December 26, 1908, Serial No. 469,240. Renewed November 4, 1911. Serial No. 658,617.

*To all whom it may concern:*

Be it known that I, EBEN G. DODGE, a citizen of the United States, and a resident of South Orange, in the county of Essex and State of New Jersey, have invented certain new and useful Improvements in Battery-Plates, of which the following is a specification.

My invention relates to electric batteries and more particularly to primary batteries although in some of its features it is useful in any battery in which the elements are immersed in electrolyte in which the generation of electrical energy is brought about by the chemical and electrical reactions between the electrolyte and the element or elements of the cell.

My invention is particularly useful for primary batteries in which a copper or other oxid is employed as or in association with one element of the battery and zinc or other metal which consumes and disintegrates is employed as the other element.

My invention relates more particularly to the elements of the battery and its object is, generally speaking, to secure economy, strength and compactness as well as other advantages which will be evident to those skilled in the art.

One part of my invention relates more particularly to the construction of the element embodying the metallic oxid and consists, generally speaking, in supporting the metallic oxid upon an enameled metallic backing with which it is united by the enamel on the surface thereof.

Another part of my invention relates to the positive element of the battery and consists, generally speaking, in uniting zinc or other metal plate with a non-disintegrating backing consisting of an enameled plate to which the zinc or other metal is cemented or secured by the enamel.

Another part of my invention consists of a compound battery plate, the two elements of which are supported upon and secured to a backing or support plate consisting of enameled metal the enamel of which serves as the means for fastening the said elements to their support and preferably also as an insulation of the elements from one another.

My invention further consists in the particular construction more particularly specified in the claims at the end of this description.

In the accompanying drawings I have shown a vertical central section through a battery plate embodying my invention.

1 indicates the support or support plate which is preferably imperforate and flat upon its surface although it might be corrugated or otherwise formed to assist in holding the elements or material applied to its face or faces. As is well understood in the art, it might be reticulated or otherwise constructed to have openings through it.

2 indicates the copper or other oxid and 3 a coating of enamel shown exaggerated in thickness upon the surface of the plate 1. The mass of copper oxid made plastic and compressed in the manner usually employed in the art of constructing copper oxid plates is compressed upon the enameled surface of the plate 1 and the two are then fired or baked at the temperature usually employed in consolidating copper oxid plates or at a sufficiently high temperature to fuse and soften the enamel upon the surface of the plate 1 so that on cooling said enamel will firmly cement or unite the oxid and the supporting plate together.

The enameled supporting plate is preferably an enameled iron plate and obviously may be very thin, owing to the fact that it may be protected by its enamel upon the face opposite that to which the oxid is secured and so that it will not be attacked by the electrolyte. By this construction of plate a very thin layer or plate of oxid may be employed and obviously a large capacity secured in a small cell. Further, the element may be easily stored and shipped without danger of chipping or breaking of the oxid while moreover the oxid will not become readily detached from its support in use in the cell.

4 indicates a plate of zinc or other suitable metal forming the positive element of the battery. Said element 4 is fastened in a similar way to the surface of its support by the enamel of said surface. This can be done, after the union of the oxid and supporting plate has been effected, by assembling plate 1 and the zinc or other metal with their surfaces firmly pressed together and then heating to a temperature sufficient to soften or melt the enamel and thereby bring about a union of the zinc or other metal element with said supporting plate.

In the particular construction of elements shown the enamel, if of sufficient thickness, will serve as an effectual insulator for insulating the positive element from the negative on their support. The particular construction shown affords also a compound battery element of great compactness and cheapness.

Plainly, the amount of zinc or other metal which consumes and disintegrates can be just sufficient to bring about a complete consumption thereof when the battery is used up or exhausted. This is a distinct advantage over the ordinary forms of zinc battery in which, as is well known, a certain amount of zinc always remains as waste and to a very considerable amount when a part of the zinc element projects from the electrolyte and is used as a means for supporting the element. In my form of battery no excess zinc is necessary for this purpose as the support plate forms the support and by experiment only so much zinc as will be used up during the life of the battery need be provided.

It will be understood that connections with the positive and negative elements may be made for drawing current from the battery in the ways usually practised in the art for making connection with a zinc element and with the negative element; thus for instance conducting wires might be cast into the material of the element itself or in the case of the zinc or metal element a screw of conducting material may be tapped into the metal and the connecting wire attached thereto; in the case of the negative element the connection may be made as usual with the copper oxid by inclosure of that portion of the battery in a frame and by attachment of the conducting wire to said frame or contact therewith may be made by drilling a hole in the end of the element into which some conducting material like lead is cast and into which, at the same time, a brass or other contact screw is also inserted. Various other expedients, such as have heretofore been used in the art, for making connection to the positive or negative element of the battery, will readily occur to those skilled in the art as suitable for the purpose.

By the term enamel herein employed, it will be understood that it means and covers any coating which will fuse when the backing and active material spread thereon are fired and serve as a bond to join said materials as hereinbefore described.

I do not herein claim the method of manufacturing the battery plate hereinbefore described and in the manner set out in the foregoing specification, as this method forms the subject of claims in an application for patent filed by me on the 4th day of November 1911, Serial No. 658,467, as a division of the present application. Nor do I claim herein a battery plate having the zinc or other disintegrating metal element supported by a backing to which it is united by enamel on the surface thereof, as this feature of my invention is claimed broadly in another application for patent filed by me as a division hereof, on the 4th day of November 1911, Serial No. 658,465.

What I claim as my invention is:

1. A battery element consisting of an enameled metallic backing and a mass of metallic oxid united with said backing by the enamel thereof as and for the purpose described.

2. A battery plate consisting of compressed copper oxid and a backing of enameled metal cemented or united to the oxid by the enamel.

3. A battery plate consisting of compressed copper oxid and a backing of enameled iron to which the oxid is fastened by the enamel.

4. A compound battery plate consisting of a metallic oxid compressed upon and united with the enameled surface of a metal backing and a positive element united with the enameled surface of the opposite side of said backing as and for the purpose described.

5. A compound battery plate comprising copper oxid, an enameled iron plate and a zinc plate, said enameled iron plate having copper oxid compressed and united with one enameled surface and having the zinc fastened to said iron plate by the enamel of the opposite surface.

6. A compound battery plate consisting of an enameled metal backing plate having compressed copper oxid united by the enamel to one face of the backing plate and a zinc element united by the enamel of the backing plate to another surface thereof.

7. In a battery, a backing plate combined with a mass of depolarizing material united with one surface thereof and a metal which consumes in the battery fluid and which is fastened to another surface of said backing plate by enamel.

8. In a copper oxid battery, a compound battery plate comprising copper oxid, a backing plate and a zinc plate, said backing plate having the copper oxid united with one surface and the zinc plate united with the opposite surface thereof.

9. In a copper oxid battery, an enameled metal backing plate combined with a mass of compressed and solidified copper oxid united with one surface thereof by the enamel and with a zinc element united with the opposite surface thereof by the enamel on said surface as and for the purpose described.

10. A compound battery plate consisting of metallic oxid, zinc and an enameled iron plate interposed between the oxid and zinc and united therewith by its enamel coating.

Signed at New York in the county of New York and State of New York this 18th day of December A. D. 1908.

EBEN G. DODGE.

Witnesses:
   C. F. TISCHNER, Jr.,
   IRENE LEFETORATZ.

Copies of this patent may be obtained for five cents each, by addressing the "Commissioner of Patents, Washington, D. C."